United States Patent
Noirie

(10) Patent No.: US 7,286,765 B2
(45) Date of Patent: Oct. 23, 2007

(54) CONFIGURABLE OPTICAL SIGNAL PROCESSING DEVICE WITH WIDEBAND SOURCES

(75) Inventor: Ludovic Noirie, Nozay (FR)

(73) Assignee: Alcatel, Paris (FR)

( * ) Notice: Subject to any disclaimer, the term of this patent is extended or adjusted under 35 U.S.C. 154(b) by 546 days.

(21) Appl. No.: 10/873,281

(22) Filed: Jun. 23, 2004

(65) Prior Publication Data

US 2004/0264967 A1    Dec. 30, 2004

(30) Foreign Application Priority Data

Jun. 24, 2003    (FR) .................................. 03 07589

(51) Int. Cl.
*H04J 14/02* (2006.01)
(52) U.S. Cl. .......................................... 398/91; 398/49
(58) Field of Classification Search ............ 398/48–51, 398/91
See application file for complete search history.

(56) References Cited

U.S. PATENT DOCUMENTS 6,388,782 B1    5/2002    Stephens et al.
6,643,463 B1 *  11/2003   Suzuki et al. .................. 398/49
2002/0030869 A1  3/2002   Okazaki
2002/0141453 A1  10/2002  Ghani
2002/0159116 A1  10/2002  Shiozaki
2002/0191904 A1* 12/2002  Kani et al. ..................... 385/24
2003/0161629 A1*  8/2003  Frascolla et al. ............... 398/5

FOREIGN PATENT DOCUMENTS

FR    2 816 063         5/2002
WO    WO 02/33465 A1   4/2002
WO    WO 03/047145 A2  6/2003

* cited by examiner

*Primary Examiner*—Leslie Pascal
(74) *Attorney, Agent, or Firm*—Sughrue Mion Pllc.

(57) ABSTRACT

A device for processing optical signals comprises sources each delivering, substantially simultaneously, optical signals in accordance with a comb of at least two different wavelengths or a continuum of wavelengths. It further comprises multiplexers adapted to deliver to at least one primary port a multiplex of channels corresponding to chosen bandwidths produced from optical signals received at secondary ports each provided with selective spectral filters adapted to pass optical signals whose wavelengths belong to one of the bandwidths corresponding to one of the channels of the multiplex. It further comprises optical routers for routing the optical signals delivered by the sources to secondary ports of the first multiplexers as a function of instructions received.

12 Claims, 1 Drawing Sheet

CONFIGURABLE OPTICAL SIGNAL PROCESSING DEVICE WITH WIDEBAND SOURCES

CROSS-REFERENCE TO RELATED APPLICATIONS

This application is based on French Patent Application No. 03 07 589 filed Jun. 24, 2003, the disclosure of which is hereby incorporated by reference thereto in its entirety, and the priority of which is hereby claimed under 35 U.S.C. §119.

BACKGROUND OF THE INVENTION

1. Field of the Invention

The invention relates to the field of devices for processing optical signals and more particularly to resource (or optical signal) routing devices.

2. Description of the Prior Art

Optical communication networks generally comprise optical nodes, for example optical add/drop multiplexers (OADM), provided with a processing device for routing (or switching) resources to another node or to terminals or servers.

To this end, the processing devices generally comprise supply means adapted to deliver optical signals, multiplexing means adapted to deliver to at least one primary port a multiplex of channels corresponding to chosen bandwidths and comprising optical signals received at secondary ports, and optical routing means adapted, as a function of instructions received, to route the optical signals delivered by the supply means selectively to second ports of the first multiplexing means.

In the present context, "multiplexing means" means unidirectional multiplexers, unidirectional demultiplexers and bidirectional multiplexers/demultiplexers. Also, "primary port" means an input and/or an output of multiplexer means adapted to deliver and/or to receive a multiplex. Also, "secondary port" means an input and/or an output of multiplexer means adapted to deliver and/or to receive optical signals that are not multiplexed.

For the optical nodes to be (re)configurable, the supply means of their processing device comprise sources consist of lasers whose wavelength may be tuned. These tunable lasers require control devices for controlling their output wavelength by feedback, and this considerably increases the cost of the sources.

Thus an object of the invention is to remedy this problem.

SUMMARY OF THE INVENTION

The invention therefore proposes an optical signal processing device comprising supply means adapted to deliver optical signals, first multiplexing means adapted to deliver to at least one primary port a multiplex of channels corresponding to chosen bands, on the basis of optical signals received at secondary ports, and optical routing means adapted to route the optical signals delivered by the supply means selectively to secondary ports of the first multiplexing means, as a function of instructions received, in which device the supply means comprise a multiplicity of sources each adapted to deliver substantially simultaneously optical signals having the same modulation and carried by different wavelengths, and each secondary port of the first multiplexing means comprises selective spectral filtering means adapted to pass only an associated portion of the wavelengths of the optical signals delivered by the supply means, the portion belonging to one of the bands corresponding to one of the channels of the multiplex.

In other words, sources are used that deliver to a multiplexer either a "comb" of wavelengths (for example mode locked lasers or a strip of continuous lasers with different wavelengths) or wideband light (for example light-emitting diodes (LEDs), super-LEDs, or semiconductor optical amplifiers (SOA)), and the required wavelength is selected at the level of the multiplexer means.

The processing device may have other features, individually or in combination, and in particular:

- first multiplexing means able to receive a multiplex at their primary port(s) and to deliver to their secondary ports the optical signals contained in the multiplex as a function of the bands to which their respective wavelengths belong; in this case, receiving means are also provided for receiving optical signals coming from the secondary ports of the first multiplexing means and routed by the routing means, as a function of instructions received; the receiving means may be divided into receiving modules for receiving optical signals that may have any wavelength;
- second multiplexing means comprising at least one primary port for receiving a multiplex and secondary ports coupled to the routing means and also comprising selective spectral filtering means passing only optical signals whose wavelengths belong to one of the bands corresponding to one of the channels of the multiplex; in this case, the second multiplexing means may also be adapted to deliver at their primary port(s) a multiplex containing optical signals routed to their secondary ports by the optical routing means;
- routing means for routing certain of the optical signals delivered by the secondary ports of the second multiplexing means to the receiving means, as a function of instructions received,
- routing means for routing certain of the optical signals delivered by the secondary ports of the first (or second) multiplexing means to the secondary ports of the second (or first) multiplexing means, as a function of instructions received, and
- selective spectral filtering means of the first and/or second multiplexing means taking the form of thin film filters or array waveguide grating (AWG) wavelength splitters, for example.

A processing device according to the invention may advantageously constitute an optical add/drop node of the OADM type for adding/dropping optical signals.

Other features and advantages of the invention will become apparent on examining the following detailed description and the appended drawings.

DETAILED DESCRIPTION OF THE PREFERRED EMBODIMENT

The appended drawings may constitute part of the description of the invention as well as, if necessary, contributing to the definition of the invention.

An object of the invention is to allow the (re)configuration of a processing device for routing (or switching) optical signals.

One embodiment of a processing device of the invention, hereinafter referred to a switching node D, is described first with reference to FIG. 1.

A switching node D of the invention comprises supply means for supplying optical signals, referred to hereinafter as sources S, each source S having a wide optical bandwidth (covering several—at least two—channels of the output multiplex), optical spatial routing (or switching) means, referred to hereinafter as routing modules A, and first multiplexing means, referred to hereinafter as multiplexers M1-i. In this minimum configuration, the multiplexing means are adapted to deliver only one multiplex to only one output port. Here "multiplex" means a set of channels corresponding to chosen bandwidths and some of which contain optical signals.

Figure 1:
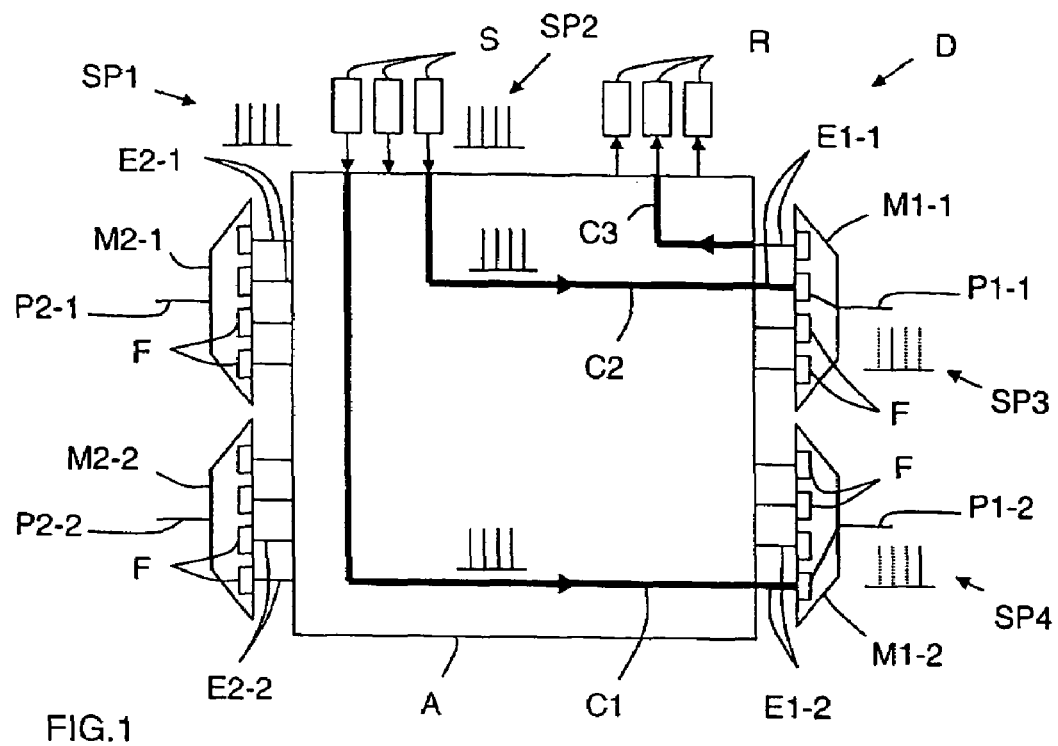
FIG. 1 shows diagrammatically a first embodiment of a processing device of the invention.

The example depicted in FIG. 1 is much more comprehensive than this. The first multiplexing means comprise two multiplexers M1-i (i=1, 2), here of the 1×4 type (having a primary port P1-i intended to be connected to an optical fiber and four secondary ports E1-i connected to the routing module A). Besides, the switching node D here comprises second multiplexing means also consisting of two multiplexers M2-j (j=1, 2), here of the 1×4 type (having one primary port P2-j, intended to be connected to an optical fiber and four secondary ports E2-j connected to the routing module A).

Hereinafter all the multiplexers M1-i and M2-j are considered to be of the bidirectional type, so that each is able to deliver and to receive a multiplex (i.e. to provide both multiplexing and demultiplexing). Consequently, the primary ports P1-i and P2-j are input or output ports and the secondary ports E1-i and E2-j are also input or output ports, depending on the configuration of the system. In this situation, there is therefore no difference between the first multiplexers M1-i and the second multiplexers M2-j, which together constitute multiplexing means.

Of course, variants may be envisaged in which all the multiplexers M1-i and M2-j are of the unidirectional type, the first multiplexers M1-i delivering multiplexes (and acting only as multiplexers) and the second multiplexers M2-j receiving multiplexes (and acting only as demultiplexers), or in which the first multiplexers M1-i and the second multiplexers M2-j each deliver multiplexes.

If the number of multiplexers is large, the routing module A may have a multistage architecture, for example.

Because the multiplexers M1-i and M2-j are all of the directional type here, the switching node D also comprises receiving means R for receiving optical signals coming from secondary ports E of the first multiplexers M1-i or the second multiplexers M2-j via the routing module A.

As shown here, the receiving means preferably take the form of receiving modules R each of which is adapted to receive optical signals at any wavelength.

According to the invention, each source S delivers, substantially simultaneously, optical signals having at least two different wavelengths.

Here "having at least two different wavelengths" means not only having a plurality of wavelengths spaced from each other but also a virtually infinite number of wavelengths (i.e. a continuum of wavelengths).

To this end, two embodiments may be envisaged.

In a first embodiment, each source S comprises, firstly, a plurality of lasers (for example n=4 lasers) each delivering a chosen wavelength continuously and, secondly, a unidirectional n×1 multiplexer with n inputs supplied by the outputs of the n lasers and delivering at an output coupled to the routing module A a "comb" consisting of n wavelengths, of the type indicated by the references SP1 and SP2 in FIG. 1. This source carries the information to be transmitted either by direct simultaneous modulation by the n lasers or by external modulation of the output signal of the n×1 unidirectional multiplexer. Alternatively, a single mode locked laser may be used, which delivers a multiple wavelength signal. In this case, the information to be transmitted is modulated either directly in the mode locked laser or by an external modulator at the output of the mode locked laser.

In a second embodiment, each source S comprises a wideband light generator. A generator of this kind may be a light-emitting diode (LED), for example, delivering "noise" at substantially constant power. Alternatively, each generator may be a super LED. In another variant, each generator may be a semiconductor optical amplifier (SOA). In this second embodiment, the source carries the information to be transmitted either by direct modulation of the wideband light generator or by external modulation at the output of the wideband light generator.

With the above types of source S, the optical signals that are supplied to the router module A and must be routed by the latter to one of the multiplexers M1-i and M2-j have the n wavelengths of the comb or are spread across the whole of the band (or the continuum), depending on their implementation.

The sources S are preferably modulated at high bit rates, for example 2.5 Gbit/s.

Moreover, it is important to note that the sources are not necessarily all of the same type.

The selection of the required wavelength for a given channel, which must be multiplexed with channels at other wavelengths in order to constitute a multiplex, is then effected in the multiplexer M1-i or M2-j that receives the optical signals from the routing module A.

To be more precise, according to the invention, each secondary port E of a multiplexer M is provided with a selective spectral filter F that passes only optical signals that have wavelengths belonging to its spectral filter band. Each spectral filter band corresponds to one of the channels of the multiplex. Thus all of the secondary ports E of a multiplexer M cover all of the channels of the multiplex delivered (or received) by said multiplexer M.

In other words, each selective spectral filter F passes some of the wavelengths of the optical signals delivered by the sources S and belonging to one of the bands corresponding to one of the channels of the multiplex.

Each spectral filter F may take the form of a thin film filter comprising a stack of layers with different indices, for example, also known as an interference filter. This type of filter is advantageous because it provides high optical isolation between the secondary ports E. Alternatively, each spectral filter F may take the form of a wavelength splitter using an array waveguide grating (AWG), for example. Any other optical multiplexing solution may be used.

When the source S delivers a comb of wavelengths, filtering consists simply in selecting chosen wavelengths (to be more precise wavelengths belonging to a chosen band). On the other hand, when the source S delivers optical signals in a wide band, filtering consists in dividing the band into slices (this is known as spectral slicing).

It is important to note that the multiplexer filters are not necessarily of the same type.

In the example shown in FIG. 1, the leftmost source S supplies to the routing module A a first comb (SP1) of four wavelengths and the rightmost source S supplies to the routing module A a second comb (SP2) of four wavelengths. In this example the routing module A is temporarily configured (in accordance with instructions received), firstly, to route via a first circuit C1 the optical signals of the first comb SP1 to the fourth secondary port E1-2 of the multiplexer M1-2 and, secondly, to route via a second circuit C2 the optical signals of the second comb SP2 to the second secondary port E1-1 of the multiplexer M1-1.

When the second secondary port E1-1 of the multiplexer M1-1 receives optical signals from the second circuit C2, its sends them to its selective spectral filter F, which passes only those having a wavelength corresponding to the second channel of the multiplex, after which the filtered signals, which are intended for the second channel, may be multiplexed with other optical signals (coming from one of the multiplexers M2-j, for example) and intended for the other three channels of the multiplex, as shown by the spectrum SP3 in FIG. 1. Similarly, when the fourth secondary port E2-1 of the multiplexer M1-2 receives optical signals from the first circuit C1, it sends them to its spectral filter F, which passes only those having a wavelength corresponding to the fourth channel of the multiplex, after which the filtered signals, which are intended for the fourth channel, may be multiplexed with other optical signals (coming from one of the multiplexers M2-j, for example) and intended for the other three channels of the multiplex, as shown by the spectrum SP4 in FIG. 1.

When the switching node D comprises receiver modules R, it may drop optical signals contained in a multiplex received via one of its primary ports P1-i or P2-j. To this end, the various channels of the multiplex received are sent to the various secondary ports E of the receiving multiplexer M, which then delivers the signals that it contains to the routing module A. As shown in FIG. 1, for example, the routing module A is configured in accordance with instructions received to route optical signals from the first secondary port E1-1 of the multiplexer M1-1 to the central receiver module R via the third circuit C3, while optical signals belonging to the other channels of the multiplex are routed to one of the multiplexers M2-j, where they are multiplexed into a new multiplex with other optical signals supplied by one of the sources S.

Figure 2:
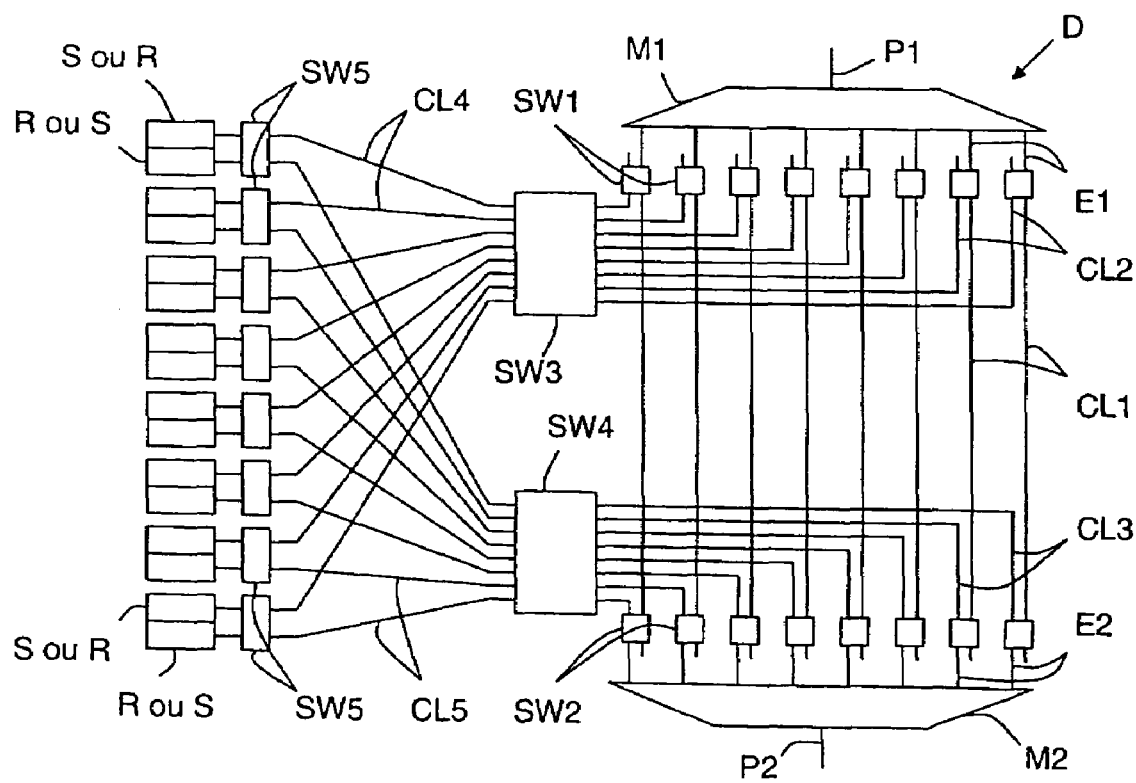
FIG. 2 shows diagrammatically a second embodiment of a processing device of the invention taking the form of an OADM type optical node for adding/dropping optical signals.

Another example of the device according to the invention, described next with reference to FIG. 2, takes the form of an optical node of the OADM type for adding/dropping optical signals.

In this example, the optical node D comprises first of all two bidirectional 1×8 multiplexers M1 and M2 (having one main port P1 or P2 and eight secondary ports E1 or E2), each responsible for receiving or supplying a multiplex comprising eight channels.

Each of the eight secondary ports E1 of the multiplexer M1 is connected to a 1×2 first add/drop module SW1. Similarly, the eight secondary ports E2 of the multiplexer M2 are each connected to a 1×2 second add/drop module SW2. Although this is not shown in FIG. 2, each secondary port E1, E2 is equipped with a selective spectral filter F.

Each first add/drop module SW1 is connected to a second add/drop module SW2 by a connection circuit CL1. Also, the first add/drop modules SW1 are connected by a second connection circuit CL2 to an 8×8 first switch SW3 and the second add/drop modules SW2 are connected by a third connection circuit CL3 to an 8×8 second switch SW4.

The first switch SW3 is connected by eight connection circuits CL4 to eight 2×2 switches SW5 and the second switch SW4 is connected by eight connection circuits CL5 to the eight switches SW5.

Finally, each switch SW5 is connected to a wideband source S or to a source delivering a comb and to a receiver module R.

Here the components CL1 to CL5 and SW1 to SW5 constitute the routing module A.

The switches SW5 may be connected indifferently to two sources S, two receivers R, or one receiver R and one source S, independently of each other. Moreover, the switches SW5 shown in the figure may be 2×2 switches, but some of them may be 1×2 switches.

Of course, this optical node lends itself to numerous variants, in particular in terms of the number and type of multiplexers and the number of stages and switch types.

This switching node D operates in the same manner as that described previously with reference to FIG. 1. If the multiplexers/demultiplexers P1-1 and P1-2 of FIG. 1 are identical to the multiplexers/demultiplexers P1 and P2 of FIG. 2, to set up a type C1 (respectively C2) circuit it is sufficient to configure, firstly, the switch SW5 corresponding to the source S to direct optical signals from that source S to SW4 (respectively SW3), secondly, the switch SW2 (respectively SW1) corresponding to the port E2 (respectively E1) appropriate for connecting that port to the switch SW4 (respectively SW3), and thirdly, the switch SW4 (respectively SW3) to connect the switch SW5 to the switch SW2 (respectively SW1). When these connections C1 (respectively C2) are made, the signals therefore travel from the source S to the multiplexer/demultiplexer P2 (respectively P1). The type C3 connection is made in the same manner, except that the signal travels from the multiplexer/demultiplexer P1 or P2 to the switch SW5 and the receiver R. Moreover, for signals in transit coming from P1 (respectively P2) and going to P2 (respectively P1), it is sufficient to configure the corresponding switches so that the signal travels from the corresponding ports E1 (respectively E2) to the corresponding ports E2 (respectively E1), via the corresponding connections CL1.

It is important to note that two (or more) receivers may be dedicated to receiving optical signals having identical wavelengths but coming from different optical fibers.

The invention is not limited to the embodiments of the processing device and the optical node described hereinabove by way of example only, but encompasses all variants within the scope of the following claims that the person skilled in the art might envisage.

The invention claimed is:

1. An optical signal processing device comprising supply means adapted to deliver optical signals, first multiplexing means adapted to deliver to at least one primary port a multiplex of channels corresponding to chosen bands, on the basis of optical signals received at secondary ports, and optical routing means adapted to route said optical signals delivered by said supply means selectively to secondary ports of said first multiplexing means, as a function of instructions received, in which device said supply means comprise a multiplicity of sources each adapted to deliver substantially simultaneously optical signals having the same modulation and carried by different wavelengths, and each secondary port of said first multiplexing means comprises selective spectral filtering means adapted to pass only an associated portion of the wavelengths of the optical signals delivered by said supply means, said portion belonging to one of the bands corresponding to one of the channels of said multiplex, and the wavelengths delivered by one source cover several wavebands associated with several secondary ports of the first multiplexing means.

2. The processing device claimed in claim 1 wherein at least some of said sources comprise at least two lasers each delivering light at a chosen wavelength and a multiplexer adapted to deliver a combination of said lights.

3. The processing device claimed in claim 1 wherein at least some of said sources comprise a mode locked laser.

4. The processing device claimed in claim 1 wherein at least some of said sources comprise a wideband light generator.

5. The processing device claimed in claim 4 wherein said wideband light generators are selected from a group including light-emitting diodes, super light-emitting diodes and semiconductor optical amplifiers.

6. The processing device claimed in claim 1 wherein said first multiplexer means are adapted to receive at each primary port a multiplex of channels corresponding to chosen bands and containing optical signals and to deliver said optical signals to said secondary ports as a function of the bands to which their respective wavelengths belong, and wherein said device comprises receiver means adapted to receive optical signals and said routing means are adapted to route certain of said optical signals delivered by said secondary ports of said first multiplexing means to said receiver means as a function of instructions received.

7. The processing device claimed in claim 6 wherein said receiver means comprise at least two receiver modules adapted to receive optical signals at any wavelength.

8. The processing device claimed in claim 1 comprising second multiplexing means comprising at least one primary port adapted to receive a multiplex of channels corresponding to chosen bands and containing optical signals and secondary ports coupled to said routing means and comprising selective spectral filter means adapted to pass optical signals whose wavelengths belong to one of the bands corresponding to one of the channels of said multiplex.

9. The processing device claimed in claim 8 wherein said second multiplexing means are adapted to deliver to each primary port a multiplex of channels corresponding to chosen bands and containing optical signals received from said optical routing means at its secondary ports.

10. The processing device claimed in claim 8 wherein said routing means are adapted to route certain of said optical signals delivered by said secondary ports of said secondary multiplexing means to said receiver means as a function of instructions received.

11. The processing device claimed in claim 8 wherein said routing means are adapted to route certain of said optical signals delivered by said secondary ports of said first multiplexing means, respectively said second multiplexing means, to said secondary ports of said second multiplexing means, respectively said first multiplexing means, as a function of instructions received.

12. The processing device claimed in claim 1 wherein said selective spectral filtering means of said first multiplexing means and/or said second multiplexing means are selected from a group including thin film filters and AWG wavelength splitters.

* * * * *